May 10, 1966  R. C. ZEIDLER  3,250,357
CLUTCH LEVER ASSEMBLY WITH AUTOMATIC ADJUSTER
Filed Dec. 13, 1963  2 Sheets-Sheet 2
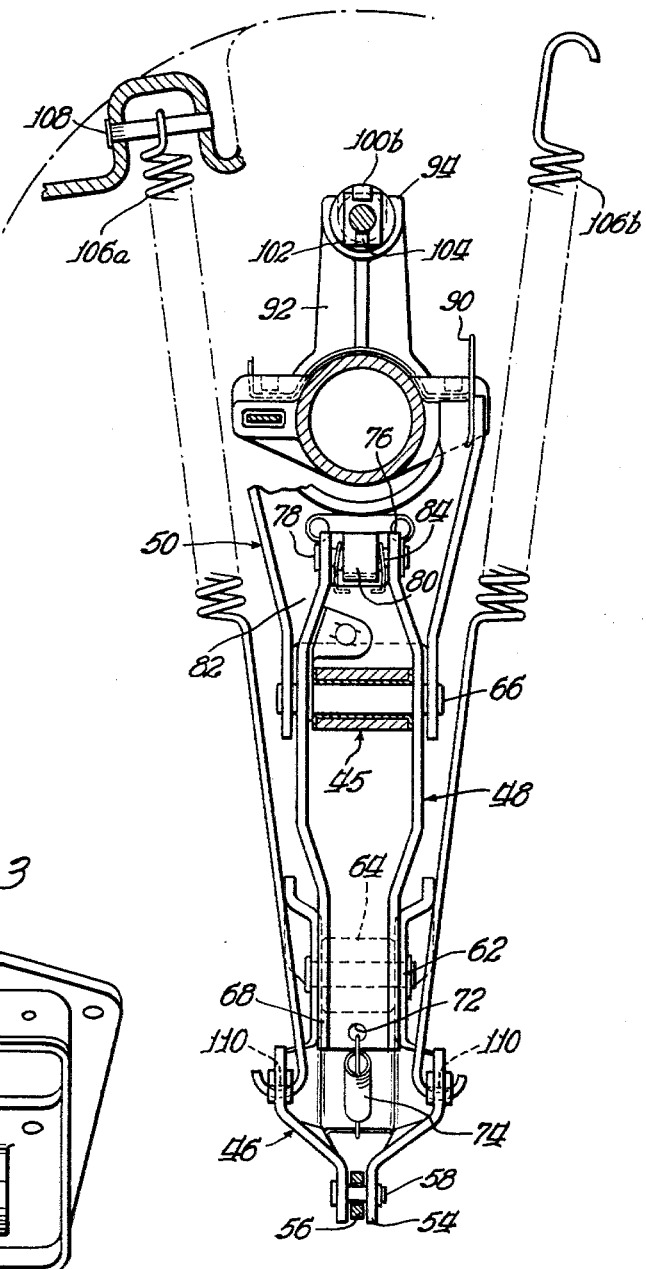
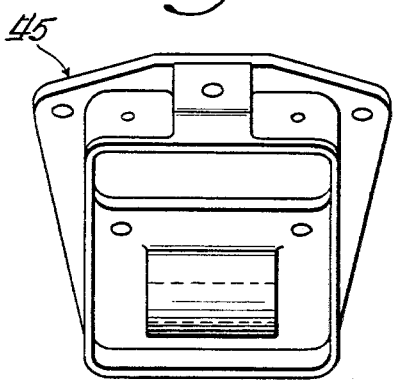
Inventor:
Reinhold C. Zeidler
By: John W Butcher
Atty.

_United States Patent Office_

3,250,357
Patented May 10, 1966

3,250,357
CLUTCH LEVER ASSEMBLY WITH
AUTOMATIC ADJUSTER
Reinhold C. Zeidler, Detroit, Mich., assignor to Borg-Warner Corporation, Chicago, Ill., a corporation of Illinois
Filed Dec. 13, 1963, Ser. No. 330,331
15 Claims. (Cl. 192—111)

This invention relates to a clutch and more particularly to a clutch suitable for use in automotive vehicles.

A typical automotive clutch includes a cover plate, release levers, a pressure plate, load springs and a driven member. These clutch elements are fastened to the flywheel and are enclosed or partially enclosed in the bell housing. It is conventional practice to position the load springs between the cover plate and the pressure plate to provide a force to engage the clutch. The load spring means normally includes a plurality of springs arranged circumferentially around the clutch between the cover plate and the pressure plate. These springs normally extend parallel to the axis of rotation of the clutch.

The diameter as well as the axial dimension of a clutch assembly is normally a function of the horsepower that is to be transmitted by the clutch. Thus, as the horsepower of a vehicle increases, it is generally necessary to increase either the diameter of the clutch or the axial dimension of the clutch. It is, however, undesirable to increase either the diameter of the clutch or the axial dimension of the clutch. It is, however, undesirable to increase either the diameter of the clutch or the axial dimension of the clutch because of space limitations in fitting the clutch into the vehicle.

Numerous attempts have been made to shorten the axial dimension of a clutch structure, one of which has been to position the load spring in a location wherein it does not add to the axial dimension of the clutch. This is accomplished by incorporating the load spring in the control linkage in a manner such that it does not occupy space between the pressure plate and the cover plate. With this type arrangement, the load spring normally exerts a force on the pressure plate by way of the clutch release bearing and the clutch release levers. Examples of this type of clutch may be found in U.S. Patents 2,234,349, 2,234,360, 2,275,387, 2,275,388 and 2,300,187. This type clutch has been termed a "remote spring" clutch as it utilizes a load spring which is remote or outside the clutch cover plate. The load spring means of the prior art devices extends longitudinally substantially parallel to the axis of rotation of the clutch outside the bell housing adjacent the engine assembly or adjacent the transmission assembly. With this type arrangement it is often possible to shorten the axial dimension of the clutch assembly provided there is sufficient space outside the housing within which to locate the spring member. The space problem in locating a spring outside the housing becomes complicated with larger engines which use elaborate exhaust systems and complex accessories such as, for example, power steering, power brakes, air conditioning and the like.

Briefly described, this invention relates to a clutch of the remote spring type wherein the housing which surrounds the driving member, driven member, pressure plate and cover plate is sufficiently large to accommodate load springs positioned transverse with respect to the rotational axis of the clutch. The clutch pedal linkage system affords low clutch pedal forces due to changing lever arms of the linkage members as the clutch moves from an engaged position to a disengaged position. An automatic adjustment means is provided in combination with the linkage system to reposition certain of the lever elements with respect to other of the lever elements to compensate for lining wear.

A more complete understanding of the invention will be readily apparent to those skilled in the art illustrating certain preferred embodiments in which:

FIGURE 2 is a partial view, partially in cross-section, of the transfer lever portion of the clutch assembly; and FIGURE 3 is a view of the bracket used to position the clutch linkage system with respect to the housing.

Figure 1:
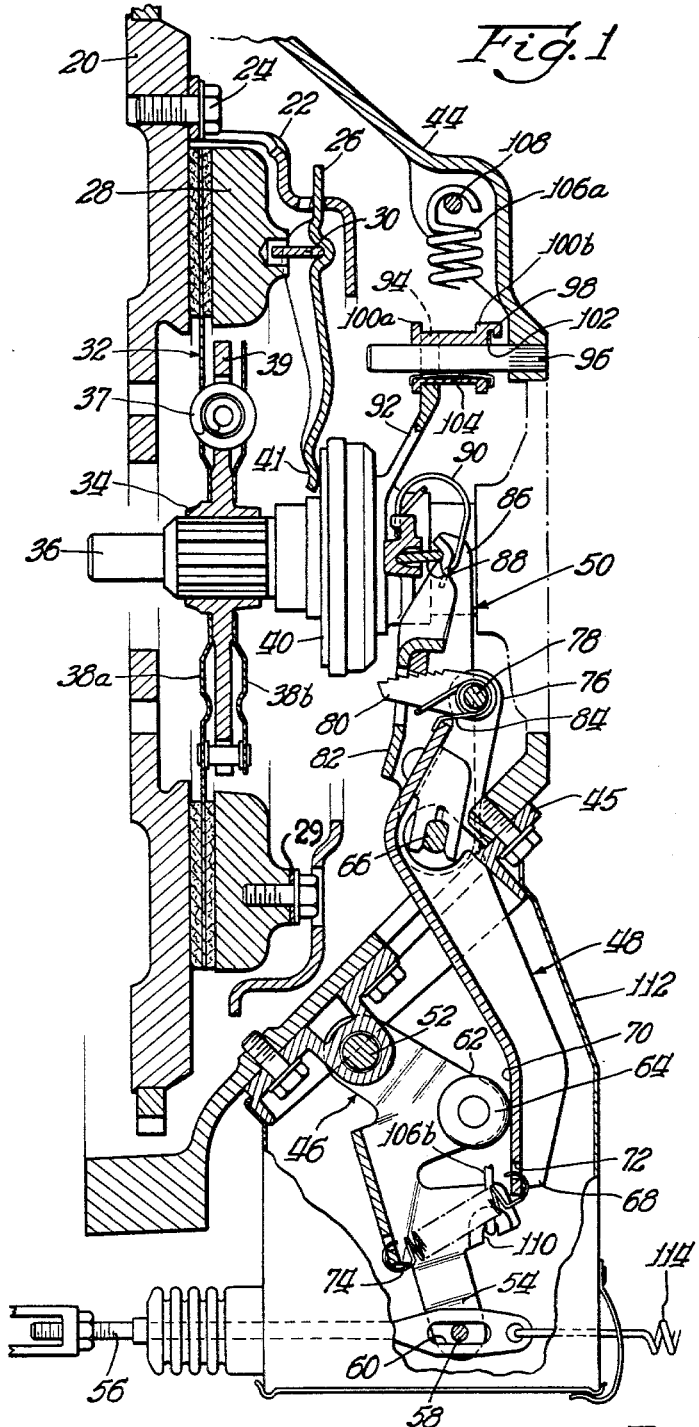
FIGURE 1 is a view, partially in cross-section, of the clutch and its associated linkage system.

Referring now to the drawings, and more particularly, FIGURE 1, the flywheel 20 is adapted to be driven by a power plant such as, for example, an internal combustion engine (not shown). The flywheel 20 carries a cover plate 22 which is mounted to the flywheel in a conventional manner by bolts 24. The cover plate 22, in turn, carries a plurality of clutch release levers 26 which are connected to the pressure plate 28 by way of release lever struts 30. A driven member 32 is positioned intermediate the driving member or flywheel 20 and the pressure plate 28 and is adapted to be drivingly mounted on a driven shaft 36 by way of a hub portion 34. The driven member 32 preferably includes a vibration damper 37 interposed between washers 38a and 38b and radial flange 39.

The driven shaft 36 carries a clutch release bearing 40 which is adapted to shift axially with respect thereto to actuate the inner terminal ends 41 of the clutch release levers.

The bell housing 44 is provided with an aperture and fittings for mounting a bracket 45 thereon. This bracket carries a control lever 46, transfer lever 48 and a release fork 50.

The control lever is adapted to pivot about a first pivot point 52 which is located on the bracket 45 and this control lever includes a first arm 54 which is adapted to engage the control rod 56 by way of a lost motion connection which comprises a pin 58 and slot 60. The control lever 46 also includes a second arm 62 which has a roller 64 rotatably mounted thereon.

The transfer lever 48 is pivotally mounted on the bracket 45 about a second pivot point 66. The transfer lever includes a first arm 68 which is provided with a roller engaging surface 70 and an aperture 72. A resilient member 74 is provided between the control lever 46 and the transfer lever 48 to insure engagement of the roller engaging surface 70 with the roller 64. The transfer lever 48 also includes a second arm 76 which is provided with a support 78. The release fork is connected to the bracket 45 about the second pivot point 66. A ratchet 80 is mounted about the support 78 and engages the release fork 50. The ratchet is urged toward the release fork 50 by way of a ratchet spring 84.

The release fork 50 includes a portion 86 which carries a strut 88 to provide a means for engaging the clutch release bearing 40. A spring 90 is used to maintain the release fork 50 in engagement with the release bearing 40.

The release bearing 40 includes a bracket 92 which extends toward the housing 44 and terminates in a U-shaped end 94. A spool guide pin 96 extends from the housing 44 through the U-shaped end 94. A reference spool 98 is positioned about the spool guide pin 96 and includes flanges 100a and 100b which are adapted to engage the U-shaped end 94 of bracket 92. A washer 102 and spring 104 are fitted in the reference spool 98 to provide for one-way movement between the reference spool 98 and the spool guide pin 96.

The load spring means includes springs 106a and 106b mounted on opposite sides of the clutch linkage system extending transversely with respect to the axis of rotation of the clutch between the bell housing 44 and the clutch cover plate 22. One end of each of the load springs is connected to the housing 44 by way of pins 108 and the opposite ends of the load springs are connected to the control lever 46 by way of slots 110.

The clutch linkage system may be hermetically sealed with respect to the interior chamber formed by the housing 44 by use of a closure 112 fitted on the housing 44 encompassing the bracket 45, control lever 46, transfer lever 48 and a portion of the control rod 56.

A pedal spring 114 is preferably connected to the control rod 56 to insure that maximum movement is provided in the lost motion connection between the control rod and the control lever.

In operation, the clutch is normally maintained in engagement by the load springs 106a and 106b acting to urge the control lever 46 to rotate about the first pivot point 52 in a counter-clockwise direction, as viewed in FIGURE 1. The moment exerted by the load springs 106a and 106b on the control lever 46 causes the roller 64 to urge the transfer lever 48 to rotate in a counter-clockwise direction about the second pivot point 66 which, in turn, drives the release fork about its pivot point 66 by way of ratchet 80. This drive is toward the left as viewed in FIGURE 1. The strut 88 pushes the release bearing 40 to the left and the release bearing 40 urges the inner ends 41 of the clutch release lever 46 in a direction to force the pressure plate 28 against the driven member 32 such that the driven member is maintained in engagement with the driving member or flywheel 20.

The clutch is disengaged by moving the control rod 56 to the left as viewed in FIGURE 1. Movement of the control rod to the left results in creating a clockwise moment of the control lever 46 about the first pivot point 52. This moment is sufficient to overcome the counter-clockwise moment exerted on the control lever 46 by the load springs 106a and 106b. This, in turn, allows the control lever 46 to rotate in a clockwise direction about the first pivot point 52. The transfer lever 48 and release fork 50 are shifted clockwise about pivot point 66 due to the action of the disc 32 regaining its original free form with the aid from straps 29 which act as retractor springs. Movement of the release bearing 40 continues until the U-shaped end 94 of the bracket 92 engages the flange 100b of the reference spool 98. The reference spool cannot move to the right with respect to the spool guide pin 96 because of the one-way motion limiter which includes washer 102 and spring 104. The clutch, however, is fully disengaged at the time the U-shaped end 94 of the bracket 92 engages the flange 100b of the reference spool 98. Final disengagement of the clutch leaves only the straps 29 exerting a force on the pressure plate and bearing.

The clutch control linkage incorporates a means for repositioning control level 46 with respect to the control rod 56 upon a predetermined amount of wear of the friction lining material. As the friction linings wear, the pressure plate 28, clutch release levers 26, and release bearing 40 assume new positions, moving toward the left as viewed in FIGURE 1 each time the clutch is engaged. This, of course, occurs in minute increments over thousands of miles of driving. Each time the release bearing 40 moves to the left (toward the flywheel) the U-shaped end 94 of the bracket 92 engages the flange 100a and moves the reference spool 98 with respect to the spool guide pin 96. Each time the clutch is released or disengaged, the U-shaped end 94 of the bracket 92 engages the flange 100b and, due to the fact that the washer 102 and spring 104 restrict movement of the reference spool 98 with respect to the spool guide pin 96 (in a direction to the right as viewed in FIGURE 1) the release bearing 40 can move only a predetermined fixed amount (with respect to the driving member) each time the clutch is disengaged. This amount is a function of the distance between flange 100a and the flange 100b.

The remaining portions of the clutch control linkage, i.e., release fork 50, transfer lever 48 and control lever 46 move as a function of the travel of the control rod 56 and the degree of lost motion afforded by the lost motion connection between the control rod 56 and the control lever 46.

As lining wear occurs, the control lever 46 rotates gradually counter-clockwise diminishing the lost motion between rod 56 and pin 58. A driver, from force of habit, will depress the clutch pedal to a certain point each time he disengages the clutch, regardless of the state of wear of the clutch linings. Therefore, as wear occurs and the lost motion reduces, the control lever 46 is rotated through a greater angle each time the clutch is disengaged. Meanwhile, the spool 98 is gradually moving to the left and changing the clutch disengaged position of the bearing. The fork 50 is maintained in engagement with the bearing by spring 90 so the angular position of the fork is determined by the bearing position. Lever 48 is caused to follow roller 64 by spring 74.

Now when a predetermined amount of lining wear has occurred and the clutch is disengaged the angular movement of lever 48 will exceed or overtravel the angular movement of the fork 50 sufficient to cause ratchet 80 to slip over to the next tooth thus changing the angular relationship between the fork and the lever.

This, upon re-engaging the clutch, re-establishes the original respective positions of the control lever 46 and the control rod 56 and re-establishes the original free play in the clutch pedal. The re-adjustment also re-establishes the original moment exerted by the load springs on the control lever about the first pivot point 52. The cycle repeats until the linings are fully worn out.

With the improvement achieved by use of this clutch assembly, it is possible to simplify the clutch pedal hardware. For example, the clutch pedal may be connected directly to the control rod 56 by way of a light, inexpensive cable operating over sheaves thus eliminating the conventional equalizer shaft, over center springs, etc.

While this invention is described in connection with certain specific preferred embodiments, it is understood to be by way of illustration only and not by way of limitation. The claims should, therefore, be construed as broadly as the prior art will permit.

What is claimed is:

1. A clutch comprising a driving member, a pressure plate, and a driven member interposed between said driving member and said pressure plate; a housing surrounding said driving member, said pressure plate and said driven member; a cover plate connected to said driving member surrounding said pressure plate and said driven member defining a space between said cover plate and said housing; a clutch release bearing slidable axially; a plurality of clutch release members connected to said cover plate and engaging said clutch release bearing; a bracket extending from said clutch release bearing and carried thereby having an end adapted to engage a motion limiting means; said motion limiting means providing a clutch disengaged stop for said clutch release bearing as a function of wear of said driven member; a control lever pivotally connected to said housing; a transfer lever pivotally connected to said housing engaging said control lever; a release fork pivotally connected to said housing and engaging said release bearing, and means to provide an adjustable connection between said release fork and said transfer lever.

2. A clutch comprising a driving member, a pressure plate, a driven member, a cover plate connected to said driving member, a clutch release bearing slidably positioned with respect to said cover plate, a plurality of clutch release members connected to said cover plate adapted to connect said clutch release bearing and said pressure plate; a housing surrounding said cover plate providing a space between said cover plate and said housing, a spool guide pin providing an axial reference member with respect to said cover plate, a reference spool slidably positioned on said spool guide pin, means to restrict the movement of said reference spool with respect to said guide pin in one direction only, abutment flanges located on said reference spool, a bracket extending from said release bearing adapted to travel between said abutment flanges, a control lever pivotally mounted to said housing, a transfer lever pivotally mounted to said housing adapted to engage said control lever, a release fork pivotally mounted on said housing and engaging said release bearing, a ratchet interposed between said transfer lever and said release fork effective to provide a drive therebetween, a control rod connected to said control lever effective to actuate same, a lost motion connection provided between said control rod and said control lever, and resilient means effective to urge said release bearing toward said clutch release lever.

3. A clutch control linkage for a clutch having a friction lining, a release bearing and a housing surrounding the release bearing comprising a control lever pivotally connected to the housing, a control rod, a lost motion connection between said control rod and said control lever, a transfer lever pivotally connected to said housing adapted to be driven by said control lever, a release fork pivoted on said housing, limit stop means connected to said clutch release bearing effective to restrict the movement of said clutch release bearing to a predetermined stroke, an adjustable driving connection between said transfer lever and said release fork effective to change the relative positions of said transfer lever and said release fork as a function of wear of said friction lining material.

4. A clutch comprising a driving member, a pressure plate and a driven member interposed between said driving member and said pressure plate; a housing surrounding said driving member, said pressure plate and said driven member; a cover plate connected to said driving member; a plurality of clutch release levers operatively connected to said cover plate and said pressure plate; a clutch release bearing connected to said clutch release levers; a control lever pivotally connected to said housing having a control lever first arm and a control lever second arm; a transfer lever pivotally connected to said housing having a transfer lever first arm in engagement with said control lever second arm and having a transfer lever second arm; a release fork pivotally connected to said housing and connected to said transfer lever second arm, said release fork being operable to shift said clutch release bearing; means connected to said release bearing to limit the stroke thereof as a function of wear of said driven member; and means to shift said transfer lever to effect engagement and disengagement of said pressure plate, driving member, and driven member.

5. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member; a plurality of clutch release levers operatively connected to said cover plate and said pressure plate; a movable clutch release bearing engaging said release levers; a control lever pivotally connected to said housing; a transfer lever pivotally connected to said housing and slidably connected to said control lever; a release fork pivotally connected to said housing and engaging said release bearing, said release fork being adjustably connected by ratchet means to said transfer lever; and means to rotate said control lever about its pivot.

6. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member defining a space between said cover plate and said housing; a plurality of clutch release levers operatively connected to said cover plate and said pressure plate; a movable release bearing engaging said release levers; a control lever pivotally connected to said housing in a manner to pivot about a point between an engaged position and a disengaged position; a transfer lever pivotally connected to said housing in engagement with said control lever adapted to be shifted thereby; a release fork pivotally connected to said housing in engagement with said release bearing; adjustable ratchet means connecting said transfer lever with said fork; a load spring positioned within said space connected to said housing and connected to said control lever defining a first moment arm about said point with said control lever in said engaged position and a second moment arm about said point with said control lever in said disengaged position; said first moment arm being in excess of said second moment arm; and means to actuate said control lever.

7. A clutch control linkage subassembly comprising a mounting bracket, a first pivot means located on said bracket, a second pivot means located on said bracket, a control lever pivotally positioned on said first pivot means, a roller rotatably supported on said control lever, a transfer lever pivotally mounted on said second pivot means adapted to engage said roller, a release fork pivotally mounted on said second pivot means adapted to be actuated by said transfer lever and adapted to engage a clutch release bearing, adjustable load carrying means pivotally connected to said transfer lever adapted to drive said release fork, resilient means connected to said linkage adapted to urge said release fork in a first direction, and manual means connected to said linkage adapted to urge said release fork in a second direction.

8. A clutch control linkage comprising a clutch cover plate, a pressure plate, a plurality of clutch release levers in engagement with said cover plate and said pressure plate, a clutch release bearing adapted to shift in a manner to move said clutch release levers, a control lever adapted to pivot about a first point, a roller rotatably supported on said control lever, means connected to said release bearing adapted to pivot about a second point including a transfer lever and including a release fork adjustably connected to said transfer lever and adapted to limit the movement of said release bearing with respect to said driving member, resilient means connected to said linkage adapted to urge said control lever in a first direction, and manual means connected to said linkage adapted to urge said control lever in a second direction.

9. A clutch control linkage for a clutch having a cover plate, a pressure plate, a plurality of release levers mounted between the cover plate and the pressure plate including inner terminal ends engaged by a release bearing, and a housing structure encompassing the clutch, said linkage comprising a first pivot and a second pivot, a control lever pivotally mounted on said first pivot including a roller rotatably supported thereon, a transfer lever pivotally connected to said second pivot having a roller surface adapted to engage said roller, a release fork pivotally connected to said second pivot adapted to engage said release bearing and having ratchet means adjustably connecting said release fork to said transfer lever, resilient means connected to said control lever adapted to urge said control lever in a first direction, and manual means connected to said control lever adapted to urge said control lever in a second direction.

10. A clutch comprising a housing; a driving member; a driven member; a pressure plate adapted to urge said driven member into engagement with said driving member; a cover plate connected to said driving member surrounding said pressure plate and said driven member; a plurality of clutch release levers mounted on said cover plate having means to engage said pressure plate and an inner terminal end adapted to engage a clutch release bearing; a transfer lever pivotally connected to said housing having a roller engaging surface thereon; a release fork in engagement with said clutch release bearing being pivotally connected to said housing; a control lever pivotally connected to said housing having a roller rotatably supported thereon; means to urge said roller engaging surface into engagement with said roller; means pivotally connected to said transfer lever in engagement with said release fork; resilient means adapted to urge said clutch release bearing in a first direction; and manual means adapted to urge said clutch release bearing in a second direction.

11. An adjustment mechanism for a clutch linkage system to compensate for wear of the friction lining material comprising a control rod, a control lever pivotally mounted on a first pivot point, a lost motion connection between said control rod and said control lever, a transfer lever pivotally mounted on a second pivot point driven by said control lever, a release fork pivotally connected to said second pivot point adapted to be actuated by said transfer lever, a ratchet interposed between said transfer lever and said release fork, resilient means interposed between said ratchet and said transfer lever to shift said ratchet relative to said transfer lever and said release fork, means to maintain said transfer lever in engagement with said control lever, means to urge said control lever in a first direction toward an engaged position, means to restrict the travel of said release fork a predetermined distance relative to the position of said pressure plate in engagement with the driving member, and means to move said control lever a distance sufficient to move said transfer lever a distance at least as great as said predetermined distance.

12. A clutch linkage system for a clutch having an axially movable release bearing and release bearing motion limiting means movable upon clutch lining wear to vary the position of release bearing movement limitation, said linkage system comprising; a bracket suitable for connection with a clutch housing structure, a first pivot point on said bracket, a second pivot point on said bracket, a control rod operable to actuate said linkage system, a control lever pivotally connected to said first pivot point and connected to said control rod through means providing for lost motion therebetween, a transfer lever pivotally connected to said second pivot point and engaging said control lever so as to be operable thereby, a release fork adapted to effect movement of the release bearing pivotally connected to said second pivot point and engaging said transfer lever so as to be operable thereby, the engagement of said release fork and said transfer lever being effected through ratchet means operable to change the relative angular relationship between said transfer lever and said release fork upon a predetermined movement of the release bearing motion limiting means.

13. A clutch comprising a driving member, a pressure plate, and a driven member interposed between said driving member and said pressure plate; a housing surrounding said driving member, said pressure plate, and said driven member, a cover plate connected to said driving member surrounding said pressure plate and said driven member defining a space between said cover plate and said housing, a plurality of clutch release levers operatively connected to said cover plate and said pressure plate, a movable release bearing engaging said release levers, a control lever pivotally connected to said housing, a transfer lever pivotally connected to said housing and engaging said control lever, a release fork pivotally connected to said housing and engaging said release bearing, adjustable load carrying ratchet means between said transfer lever and said release fork, resilient means located within the space between said housing and said cover plate connected between said housing and said control lever urging said release fork in a direction to move said pressure plate toward said driving member; and means to move said transfer lever to urge said release fork in a direction to move said pressure plate away from said driving member.

14. A clutch control linkage sub-assembly for a clutch including a release bearing and means effective to limit movement of the release bearing in one direction at variable positions dependent upon clutch lining wear, said sub-assembly including a mounting bracket, a first pivot means located on said bracket, a second pivot means located on said bracket, a control lever pivotally positioned on said first pivot means, a roller rotatably supported on said control lever, a transfer lever pivotally mounted on said second pivot means and being adapted to engage said roller, a release fork pivotally mounted on said second pivot means and being adapted to be actuated by said transfer lever and adapted to engage the clutch release bearing, ratchet means interposed between said transfer lever and said release fork, the variable limitation of movement of the release bearing dependent on clutch lining wear causing said ratchet means to be effective to change the relative position between said release fork and said transfer lever, resilient means connected to said control lever adapted to urge said release fork in a first direction and manual means connected to said control lever adapted to urge said release fork in a second direction.

15. A clutch control linkage sub-assembly for a clutch including a release bearing and means effective to limit movement of the release bearing in one direction at variable positions dependent upon clutch lining wear, said sub-assembly including a first pivot means, a second pivot means, a control lever pivotally positioned on said first pivot means, a roller rotatably supported on said control lever, a transfer lever pivotally mounted on said second pivot means and being adapted to engage said roller, a release fork pivotally mounted on said second pivot means and being adapted to be actuated by said transfer lever and adapted to engage the clutch release bearing, ratchet means interposed between said transfer lever and said release fork effective to provide a drive linkage therebetween of adjustable length, the variable limitation of movement of the release bearing dependent on clutch lining wear causing said ratchet means to be effective to change the relative position between said release fork and said transfer lever and said change of relative position between said release fork and transfer lever being effective to cause movement of said ratchet means to adjust the length of said drive linkage therebetween, resilient means connected to said control lever adapted to urge said release fork in a first direction and manual means connected to said control lever adapted to urge said release fork in a second direction.

References Cited by the Examiner

UNITED STATES PATENTS

| 2,036,004 | 3/1936 | Wemp | 192—111 |
| 2,073,705 | 3/1937 | Moorhouse | 192—111 |
| 2,248,378 | 7/1941 | Nutt | 192—89 X |
| 2,618,170 | 11/1952 | Mulcahy | 192—99 X |

FOREIGN PATENTS

| 475,712 | 4/1929 | Germany. |
| 850,846 | 9/1952 | Germany. |

DON A. WAITE, *Primary Examiner.*

DAVID J. WILLIAMOWSKY, *Examiner.*

B. W. WYCHE III, *Assistant Examiner.*